(12) United States Patent
Roy

(10) Patent No.: US 10,538,912 B2
(45) Date of Patent: Jan. 21, 2020

(54) SOUND-DEADENING PRODUCT AND METHOD OF INSTALLING SAME

(71) Applicant: Advanced Building Products, Inc., Sanford, ME (US)

(72) Inventor: Kenneth A. Roy, Shapleigh, ME (US)

(73) Assignee: Advanced Building Products, Inc., Sanford, ME (US)

( * ) Notice: Subject to any disclaimer, the term of this patent is extended or adjusted under 35 U.S.C. 154(b) by 334 days.

(21) Appl. No.: 15/662,500

(22) Filed: Jul. 28, 2017

(65) Prior Publication Data

US 2018/0087267 A1    Mar. 29, 2018

Related U.S. Application Data

(60) Provisional application No. 62/400,745, filed on Sep. 28, 2016.

(51) Int. Cl.
*E04B 1/84* (2006.01)
*B32B 5/00* (2006.01)
*B32B 7/02* (2019.01)
*G10K 11/168* (2006.01)

(52) U.S. Cl.
CPC .................. *E04B 1/84* (2013.01); *B32B 5/00* (2013.01); *B32B 7/02* (2013.01); *G10K 11/168* (2013.01); *E04B 2001/8461* (2013.01)

(58) Field of Classification Search
CPC ....... E04F 15/20; E04F 15/203; E04F 15/206; B32B 5/00; B32B 7/02; G10K 11/168; E04B 1/84

USPC .................................................. 52/403.1, 408
See application file for complete search history.

(56) References Cited

U.S. PATENT DOCUMENTS

| 5,632,844 | A | * | 5/1997 | Pate ........................ B32B 5/26 |
|||||156/290|
| 5,952,076 | A | | 9/1999 | Foster |
| 7,096,630 | B1 | | 8/2006 | Keene et al. |
| 7,886,488 | B2 | * | 2/2011 | Payne, Jr. ............... E04F 15/20 |
|||||52/144|
| 8,146,310 | B2 | | 4/2012 | Keene |
| 8,171,687 | B2 | | 5/2012 | Dellinger et al. |
| 8,528,286 | B2 | | 9/2013 | Keene |
| 8,544,218 | B2 | | 10/2013 | Dellinger et al. |
| 10,316,527 | B2 | * | 6/2019 | Keene ................. E04F 15/0215 |

(Continued)

*Primary Examiner* — Jeremy A Luks
(74) *Attorney, Agent, or Firm* — Hammer & Associates, P.C.

(57) ABSTRACT

A sound-deadening product for a flooring system with a subfloor may be installed by a single installer. The sound-deadening product has a sound-deadening upper portion with a bottom surface and a subfloor contacting layer affixed to the bottom surface of the sound-deadening upper portion. The subfloor contacting layer may include a film or be a laminate. The laminate may includes a nonwoven sheet and a film. The nonwoven sheet is generally co-extensive with the sound-deadening upper portion. The nonwoven sheet is adhered to the bottom surface of the sound-deadening upper portion. The film is generally co-extensive with the nonwoven sheet. The film is a polymer film with a thickness ≤3 mils. An upper surface of the film is adhered to a bottom surface of the nonwoven sheet, and a bottom surface of the film is in contact with the subflooring. A method for single installer installation of the sound-deadening product is also disclosed.

15 Claims, 1 Drawing Sheet

(56) References Cited

U.S. PATENT DOCUMENTS

| | | | |
|---|---|---|---|
| 10,370,860 B2* | 8/2019 | Socha | E04F 15/0215 |
| 2003/0219582 A1* | 11/2003 | Ramesh | E04F 15/18 |
| | | | 428/304.4 |
| 2004/0018354 A1* | 1/2004 | May | B32B 3/02 |
| | | | 428/317.3 |
| 2004/0192145 A1 | 9/2004 | Theoret et al. | |
| 2006/0179752 A1* | 8/2006 | Swanson | B32B 3/30 |
| | | | 52/403.1 |
| 2006/0230699 A1 | 10/2006 | Keene | |
| 2014/0196982 A1* | 7/2014 | Clausi | B32B 25/14 |
| | | | 181/294 |
| 2016/0032597 A1* | 2/2016 | Keane | E04F 15/166 |
| | | | 52/309.9 |
| 2016/0090745 A1 | 3/2016 | Roy | |

\* cited by examiner

SOUND-DEADENING PRODUCT AND METHOD OF INSTALLING SAME

RELATED APPLICATION

This application claims the benefit of U.S. Provisional Application Ser. No. 62/400,745 filed Sep. 28, 2016, incorporated herein by reference.

FIELD OF THE INVENTION

The instant invention is directed to a sound-deadening product and a method of installing the same.

BACKGROUND OF THE INVENTION

Sound-deadening products, used as underlayments in flooring systems, are being required in some buildings (e.g., residential and/or commercial buildings). These products reduce or eliminate the transmission of sound between floors in the building. Some of the popular products have a bottom layer (i.e., the side facing the subfloor) made of a nonwoven material. When these materials are placed on the subfloor (e.g., subflooring of a composite wood product, for example, particle board or flake board), it often requires two installers to properly place the sound-deadening product.

There is a need for a sound-deadening product that can be properly placed by a single installer.

SUMMARY OF THE INVENTION

A sound-deadening product for a flooring system with a subfloor may be installed by a single installer. The sound-deadening product has a sound-deadening upper portion with a bottom surface and a subfloor contacting layer affixed to the bottom surface of the sound-deadening upper portion. The subfloor contacting layer may include a film or be a laminate. The laminate may includes a nonwoven sheet and a film. The nonwoven sheet is generally co-extensive with the sound-deadening upper portion. The nonwoven sheet is adhered to the bottom surface of the sound-deadening upper portion. The film is generally co-extensive with the nonwoven sheet. The film is a polymer film with a thickness ≤3 mils. An upper surface of the film is adhered to a bottom surface of the nonwoven sheet, and a bottom surface of the film is in contact with the subflooring. A method for single installer installation of the sound-deadening product is also disclosed.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
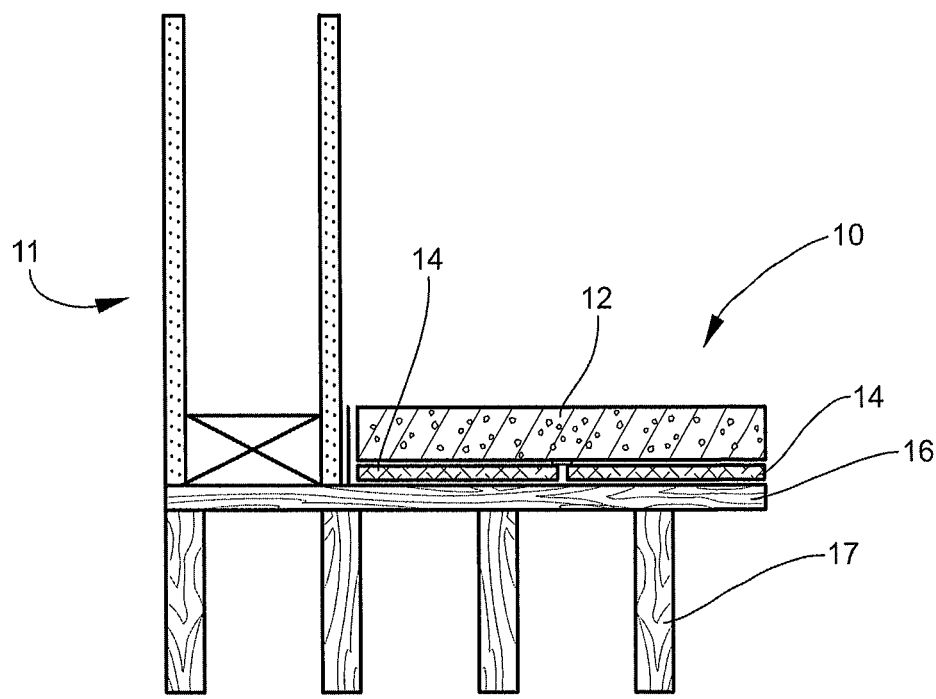
FIG. 1 is an illustration of an embodiment of the instant invention in use in a flooring system.

Referring to the drawings, wherein like elements have like numerals, there is shown in FIG. 1 a portion of a flooring system 10 and a wall system 11. The flooring system 10 includes a finished floor 12, a subfloor 16, and a sound-deadening product 14 therebetween.

The flooring system 10 may be any flooring system. The flooring system may have other structural features (as is well known to those of ordinary skill in the art). In general, the flooring system 10 may include a subfloor 16 on a system of joists 17 or a subfloor 16 on a cementitious slab (not shown).

The subfloor 16 may be any subfloor, such as those made of plywood, particle board, flake board, and/or the like. In one embodiment, the subfloor is particle board or flake board.

The finished floor 12 may be any floor, such as, a cementitious (or gypsum) floor, a wood floor, tile floor or the like. The finish floor may be a cementitious floor upon which wood, tile, and/or carpeting may be laid.

Figure 2:
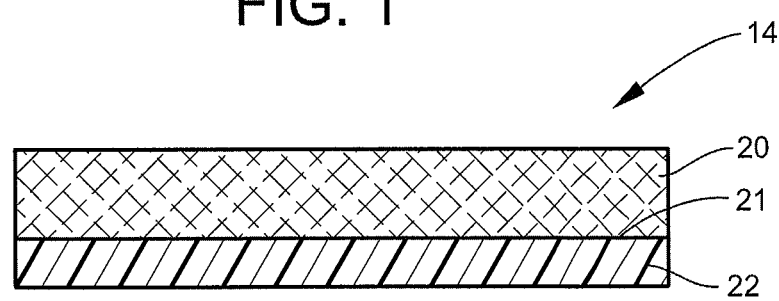
FIG. 2 is an illustration of an embodiment of the instant invention.

The sound-deadening product 14 generally includes, see FIG. 2, a sound-deadening upper portion 20 with a bottom surface 21 and a subfloor contacting layer 22 affixed (or adhered) to the bottom surface 21.

The sound-deadening upper portion 20 may include any sound-deadening material or mechanism. Such sound-deadening materials or mechanisms include, but are not limited to, a semi-rigid, flexible mat of tangled polymeric filaments with open spaces between the filaments (also referred to as an entangled net), a corrugated or dimpled entangled net, an entangled net with a film, and/or a membrane, and/or a nonwoven layer adhered to one or more exterior surface of the entangled net, a nonwoven, or a nonwoven laminate (one or more nonwoven layers or nonwoven and film and/or film layers laid up together). For example, U.S. Pat. Nos. 8,146,310; 8,528,286; and 8,544,218; and US Patent Publications Nos. 2006/0230699 and 2016/0090745, each of which is incorporated herein by reference, illustrate various sound-deadening materials or mechanisms that may be improved by the invention disclosed herein.

Figure 3:
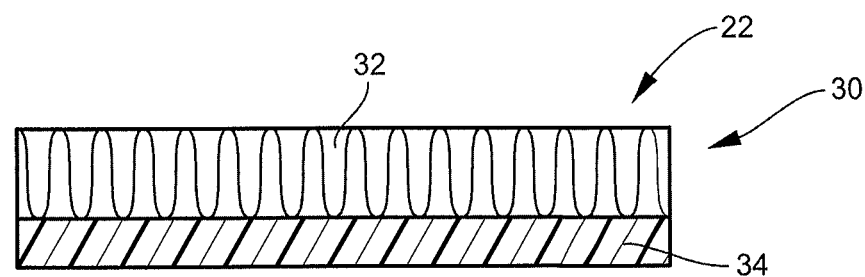
FIG. 3 is an illustration of an embodiment of the floor contacting layer of the instant invention.

The subfloor contacting layer 22 generally may be, see FIG. 3, a laminate 30 (shown) or a film layer (not shown). The laminate 30 generally includes a nonwoven 32 affixed (or adhered) to a film 34.

The nonwoven 32 may be a part of the sound-deadening upper portion 20. The nonwoven may be any nonwoven, such as a spunbond, meltblown, spunmelt, hydroentangled, felted, and/or needled nonwoven. In one embodiment, the nonwoven is a needled and/or hydroentangled nonwoven. In another embodiment, the nonwoven is a needled and/or hydroentangled nonwoven and that nonwoven is a part of the sound-deadening upper portion 20.

The film 34 may be any film. The film is primarily used to facilitate placement of the sound-deadening product; but the film may also have sound-deadening properties. The film allows the sound-deadening product to glide or slide (e.g., preventing snagging) over the subfloor, thereby allowing a single installer to place the product. The film may be a solid film. The film may have no perforations. The film may not be a nonwoven. The film may be an extruded sheet. The film may not be a membrane (e.g., the film is non-permeable, a membrane is permeable). The film may be a polymeric film. The polymer may be any polymer. Polymers may include: polyolefins (polyethylene, polypropylene and mixtures thereof), polyamides (e.g., nylons), polyesters (e.g., polyethylene terephtalate, PET), and mixtures thereof. In one embodiment, the polymer may be polyethylene, polypropylene and mixtures thereof. The film may have a thickness of less than 10 mils (≈250 micron). In one embodiment, the film may have a thickness ≤3 mils (≈75 µm). In another embodiment, the film may have a thickness 2 mils (≈50 µm). In yet another embodiment, the film may have a thickness in the range of 1-2 mils (≈25-50 μm). If the film is also used for sound-deadening, a thicker film may be used. For example, such a film may be in the range of 1-6 mils (25-150 μm), or 1-4 mils (25-100 μm).

In use, the foregoing sound-deadening product, which may be provided in sheet form or as a roll good, is unpackaged and readied for placement. The sound-deadening product 10 may be placed on the subfloor 16 by a single installer, since the film 14 facilitates placement of the sound-deadening product without the need for another installer. Thereafter, the sound-deadening product may be secured (e.g., nailing or stapling) to the subfloor in any conventional manner.

The present invention may be embodied in other forms without departing from the spirit and the essential attributes thereof, and, accordingly, reference should be made to the appended claims, rather than to the foregoing specification, as indicating the scope of the invention.

I claim:

1. A method for single installer installation of a sound-deadening product in a flooring system on a subfloor, the subfloor is a composite wood product, comprising the steps of:
    providing the sound-deadening product, the sound-deadening product has a sound-deadening upper portion with a bottom surface and a subfloor contacting layer affixed to the bottom surface of the sound-deadening upper portion, the subfloor contacting layer is a laminate, the laminate includes a nonwoven sheet and a film, the nonwoven sheet is generally co-extensive with the sound-deadening upper portion, a top surface of the nonwoven sheet is adhered to the bottom surface of the sound-deadening upper portion, the film is generally co-extensive with the nonwoven sheet, the film is a polymer film with a thickness less than or equal to 3 mils, the film is in contact with the subfloor;
    sliding the sound-deadening product into place on the subfloor with the single installer; and
    finishing a floor over the sound-deadening product.

2. The method of claim 1 wherein the flooring system is a cementitious or gypsum flooring system.

3. The method of claim 1 wherein the polymer film is a polyolefin film.

4. The method of claim 3 wherein the polyolefin film is a polyethylene film, or a polypropylene film or a film of polyethylene and polypropylene.

5. The method of claim 1 wherein the film is a solid film, or the film has no perforations, or the film is not a nonwoven, or the film is an extruded sheet, or the film is not a membrane.

6. A sound-deadening product in a flooring system on a subfloor for single installer installation, the subfloor is made of a composite wood product, comprising:
    the sound-deadening product has a sound-deadening upper portion with a bottom surface and a subfloor contacting layer affixed to the bottom surface of the sound-deadening upper portion, the subfloor contacting layer is a laminate, the laminate includes a nonwoven sheet and a film, the nonwoven sheet is generally co-extensive with the sound-deadening upper portion, the nonwoven sheet is adhered to the bottom surface of the sound-deadening upper portion, the film is generally co-extensive with the nonwoven sheet, the film is a polymer film with a thickness less than 3 mils, an upper surface of the film is adhered to a bottom surface of the nonwoven sheet, and a bottom surface of the film is in contact with the subflooring.

7. The sound-deadening product of claim 6 wherein the flooring system is a cementitious or gypsum flooring system.

8. The sound-deadening product of claim 6 wherein the polymer film is a polyolefin film.

9. The sound-deadening product of claim 8 wherein the polyolefin film is a polyethylene film, or a polypropylene film or a film of polyethylene and polypropylene.

10. The sound-deadening product of claim 6 wherein the film is a solid film, or the film has no perforations, or the film is not a nonwoven, or the film is an extruded sheet, or the film is not a membrane (e.g., non-permeable).

11. A flooring system comprising:
    a finished floor, a subfloor with a sound-deadening product sandwiched between the finished floor and the subfloor, the subfloor is made of a composite wood product,
    the sound-deadening product has a sound-deadening upper portion with a bottom surface and a subfloor contacting layer affixed to the bottom surface of the sound-deadening upper portion, the subfloor contacting layer is a laminate, the laminate includes a nonwoven sheet and a film, the nonwoven sheet is generally co-extensive with the sound-deadening upper portion, the nonwoven sheet is adhered to the bottom surface of the sound-deadening upper portion, the film is generally co-extensive with the nonwoven sheet, the film is a polymer film with a thickness less than 3 mils, an upper surface of the film is adhered to a bottom surface of the nonwoven sheet, and a bottom surface of the film is in contact with the subflooring.

12. The flooring system of claim 11 wherein the flooring system is a cementitious or gypsum flooring system.

13. The flooring system of claim 11 wherein the polymer film is a polyolefin film.

14. The flooring system of claim 13 wherein the polyolefin film is a polyethylene film, or a polypropylene film or a film of polyethylene and polypropylene.

15. The flooring system of claim 11 wherein the film is a solid film, or the film has no perforations, or the film is not a nonwoven, or the film is an extruded sheet, or the film is not a membrane.

* * * * *